United States Patent
Jeong et al.

(10) Patent No.: US 11,063,530 B2
(45) Date of Patent: Jul. 13, 2021

(54) METHOD FOR REMOVING DIRECT CURRENT COMPONENT AT OUTPUT TERMINAL OF MMC CONVERTER

(71) Applicant: HYOSUNG HEAVY INDUSTRIES CORPORATION, Seoul (KR)

(72) Inventors: Jong Kyou Jeong, Gunpo-si (KR); Jong Yun Choi, Hwaseong-si (KR); Joo Yeon Lee, Seoul (KR); Yong Hee Park, Anyang-si (KR); Doo Young Lee, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 196 days.

(21) Appl. No.: 16/473,762

(22) PCT Filed: Dec. 14, 2017

(86) PCT No.: PCT/KR2017/014778
§ 371 (c)(1),
(2) Date: Jun. 26, 2019

(87) PCT Pub. No.: WO2018/124561
PCT Pub. Date: Jul. 5, 2018

(65) Prior Publication Data
US 2021/0126551 A1    Apr. 29, 2021

(30) Foreign Application Priority Data
Dec. 26, 2016 (KR) .......................... 10-2016-0179555

(51) Int. Cl.
*H02M 7/483*    (2007.01)
(52) U.S. Cl.
CPC .................................. *H02M 7/483* (2013.01)

(58) Field of Classification Search
CPC ...... H02M 7/483; H02M 7/537; H02J 7/0065; H02J 7/007
See application file for complete search history.

(56) References Cited

U.S. PATENT DOCUMENTS

| 9,413,260 B1 * | 8/2016 | Wu ...................... H02M 7/483 |
| 2009/0128081 A1 * | 5/2009 | Yoneda .................. B62D 5/046 318/689 |

(Continued)

FOREIGN PATENT DOCUMENTS

| JP | 2000-217365 A | 8/2000 |
| JP | 3863048 B2 | 12/2006 |

(Continued)

OTHER PUBLICATIONS

Park, Yong Hee, "A Study on the Test Circuit and Method for Performance Verification of MMC Type STATCOM", Doctoral Thesis, Graduate School, Myongji University, Aug. 2016.

*Primary Examiner* — Yusef A Ahmed
(74) *Attorney, Agent, or Firm* — Novick, Kim & Lee, PLLC; Jae Youn Kim

(57) ABSTRACT

A method of removing a direct current component at an output terminal of an MMC converter according to the present invention includes a detection step of individually detecting charging voltages charged in capacitors of a plurality of sub-modules connected in series to each other in the MMC converter; outputting an average value of the individually detected charging voltages; delaying the outputted average value by a predetermined phase to output a phase-delayed average value; outputting the average value and the phase-delayed average value as a q-axis component voltage by using a predetermined dq conversion unit; calculating an error between the q-axis component voltage and a three-phase average voltage for the q-axis component voltage; and (Continued)

outputting, through a pre-determined first PI control unit, an offset voltage for reducing the error.

3 Claims, 4 Drawing Sheets

(56) References Cited

U.S. PATENT DOCUMENTS

| | | | | |
|---|---|---|---|---|
| 2011/0309871 | A1* | 12/2011 | Miyahara | G01S 19/14 327/299 |
| 2013/0082636 | A1* | 4/2013 | Ohori | H03H 17/06 318/723 |
| 2013/0271077 | A1* | 10/2013 | Kim | H02J 7/02 320/109 |
| 2013/0328398 | A1* | 12/2013 | Kanao | H02J 3/1814 307/23 |
| 2014/0112801 | A1* | 4/2014 | Kozaki | H02P 6/185 417/44.11 |
| 2014/0145665 | A1* | 5/2014 | Shouji | B60L 15/025 318/503 |
| 2015/0270787 | A1* | 9/2015 | Fujisaki | G05F 1/61 363/41 |
| 2015/0288287 | A1* | 10/2015 | Madawala | H02M 3/33507 363/21.01 |
| 2016/0020628 | A1* | 1/2016 | Guo | H02M 7/483 307/72 |
| 2016/0056727 | A1* | 2/2016 | Mukunoki | H02M 7/483 363/68 |
| 2016/0105020 | A1* | 4/2016 | Guo | H02J 7/342 307/31 |
| 2016/0336874 | A1* | 11/2016 | Kikuchi | H02M 7/53871 |
| 2017/0207698 | A1* | 7/2017 | Kuboyama | G01R 19/04 |
| 2017/0288588 | A1* | 10/2017 | Tachibana | H02P 21/05 |
| 2018/0166972 | A1* | 6/2018 | Qi | H02M 7/483 |
| 2018/0331632 | A1* | 11/2018 | Wang | H02J 5/00 |
| 2019/0199213 | A1* | 6/2019 | Jaldanki | H02M 7/483 |
| 2019/0326837 | A1* | 10/2019 | Fujishima | H02P 21/22 |
| 2020/0161960 | A1* | 5/2020 | Mukunoki | H02J 3/26 |
| 2020/0169185 | A1* | 5/2020 | Yamamoto | H02M 7/53873 |
| 2020/0335975 | A1* | 10/2020 | Kim | F03D 13/30 |
| 2020/0350836 | A1* | 11/2020 | Geske | H02M 7/797 |
| 2020/0382032 | A1* | 12/2020 | Takase | H02P 21/05 |

FOREIGN PATENT DOCUMENTS

| | | |
|---|---|---|
| JP | 2013-055747 A | 3/2013 |
| JP | 5500141 B2 | 5/2014 |
| JP | 2015-008562 A | 1/2015 |
| KR | 10-2014-0075349 A | 6/2014 |

* cited by examiner

METHOD FOR REMOVING DIRECT CURRENT COMPONENT AT OUTPUT TERMINAL OF MMC CONVERTER

TECHNICAL FIELD

The present invention relates to a method of removing a direct current component at an output terminal of an modular multilevel converter (MMC) and, more particularly, to a method of removing a direct current component at an output terminal of an MMC converter, by which a direct current component included in an alternating current voltage is removed at an output terminal of an MMC converter connected with HVDC or STATCOM.

BACKGROUND ART

Recently, there have been continuous developments in a grid-connected system. Such a grid-connected system includes not only an inverter but also a high voltage direct current (HVDC) system, a static synchronous compensator (STATCOM) system, a power conditioning system (PCS), and the like.

The HVDC and STATCOM systems can be configured with a modular multilevel converter (MMC). Such MMC converters convert an input voltage and provide a path for current for power transmission.

To this end, the MMC converter has a plurality of sub-modules connected in series with each other, and converts direct current into alternating current through switching of a semiconductor switch included in the sub-module.

FIG. 1 is a configuration diagram showing a general MMC converter, and FIG. 2 is a circuit diagram showing a sub-module of an MMC converter. As is well known, in general, an MMC converter is configured with one or more phase modules, and each of the phase modules has a plurality of sub-modules 10 connected in series.

Each phase module connects the direct current voltage side to positive and negative direct current voltage bus lines P and N. A direct current voltage of high voltage exists between these DC voltage P and N bus lines. Each sub module 10 is formed with two connection terminals X1 and X2.

The sub-module 10 includes a bridge circuit having a plurality of semiconductor switches 21 and capacitors 22 connected in parallel to the semiconductor switches 21. The semiconductor switch 21 includes a power semiconductor element 21$a$ and a diode 21$b$ connected in anti-parallel therewith. As shown in FIGS. 2($a$) and 2($b$), the bridge circuit may be optionally implemented as a half bridge circuit or a full bridge circuit.

In the case of a three-phase MMC converter, when an alternating current is output to the output terminal of the converter, the direct current is included in the alternating current due to the influence of the internal circuit. Such direct current has a negative effect, such as a core loss, on the HVDC or STATCOM system, so a technique for removing the DC component current at an output terminal of the converter is required.

To this end, a current transformer (CT) is provided in a converter arm constituting an MMC converter to detect current flowing through a three-phase converter arm, thereby removing direct current included in an alternating current at an output terminal of the MMC converter. But there is a problem that the current transformer (CT) is very expensive.

Further, a technique for removing the direct current included in the alternating current is proposed in the related art. For example, Japanese Patent No. 5500141 discloses a power conversion device capable of effectively removing a direct current component from alternating current in a device for converting a direct current power source to an alternating current power source. In addition, Japanese Patent No. 3863048 discloses a technique for removing a direct current component which causes a direct current component offset generated in an input alternating current.

In such documents in the related art, there is a problem in that the cost is increased, since the current transformer (CT) for detecting the direct current component must be provided. In addition, there is a problem that it is difficult to precisely remove the direct current component, since an offset affecting the current at the output terminal of the converter should be detected from the current of the input terminal to remove the direct current component at the output terminal.

DISCLOSURE

Technical Problem

Accordingly, an object of the present invention is to provide a method of removing direct current components at an output terminal of an MMC converter, by which a direct current component included in alternating current at an output terminal of the MMC converter is removed at a low cost without providing additional hardware in the MMC converter connected with HVDC or STATCOM.

Also, another object of the present invention is to provide a method of removing direct current components at an output terminal of an MMC converter, by which the direct current component is removed at the output terminal of the MMC converter by extracting a q-axis component for a voltage stored in a sub-module constituting an MMC converter through dq conversion, and by outputting an offset voltage for removing an error of a 3-phase average value of the q-axis component.

Technical Solution

A method of removing a direct current component at an output terminal of an MMC converter according to an embodiment of the present invention includes a detection step of individually detecting charging voltages charged in capacitors of a plurality of sub-modules connected in series to each other in the MMC converter; a first output step of outputting an average value (Vdc_avg) of the individually detected charging voltages; a second output step of delaying the outputted average value (Vdc_avg) by a predetermined phase to output a phase-delayed average value (Vdc_avg_θdelay); a third output step of outputting the average value (Vdc_avg) and the phase-delayed average value (Vdc_avg_θdelay) as a q-axis component voltage (Vq_dc) by using a predetermined dq conversion unit; a calculation step of calculating an error between the q-axis component voltage (Vq_dc) and a three-phase average voltage (Vq_dc_3φ_avg) for the q-axis component voltage (Vq_dc); and a fourth output step of outputting, through a pre-determined first proportional integration (PI) control unit, an offset voltage (Vref_dc_current) for reducing the error.

The dq conversion unit may output the q-axis component voltage (Vq_dc) having a frequency of a direct current component output at the output terminal of the MMC converter.

The method may further include, before the detection step, outputting a dq voltage reference component (Vdq_ref) output from a current control unit of the MMC converter; and converting the dq voltage reference component (Vdq_ref) to a three-phase reference voltage using a dq inverse conversion unit which performs dq inverse conversion on the dq conversion by the dq conversion unit, wherein the three-phase reference voltage and the offset voltage output in the fourth output step are summed to be output as a gate signal of a semiconductor switch of the sub-module.

The second output step may output an average value (Vdc_avg_θdelay) delayed by 90 degrees with respect to the average value (Vdc_avg).

The method may further include, after the fourth output step, receiving the three-phase average voltage (Vq_dc_3φ_avg) from a second proportional-integral (PI) controller and performing PI control to output a three-phase offset voltage (Vref_dc_current_3φ); and summing the offset voltage (Vref_dc_current) and the three-phase offset voltage (Vref_dc_current 3φ) to output a corrected offset voltage.

Advantageous Effects

According to the present invention, it is possible to remove direct current component included in alternating current output at an output terminal of an MMC converter without providing additional hardware in the MMC converter.

Also, according to the present invention, it is possible to remove direct current component at an output terminal of an MMC converter by outputting an offset for removing an error between a q-axis component and a 3-phase average value of the q-axis component for a voltage stored in a sub-module through dq conversion.

MODE FOR INVENTION

Figure 1:
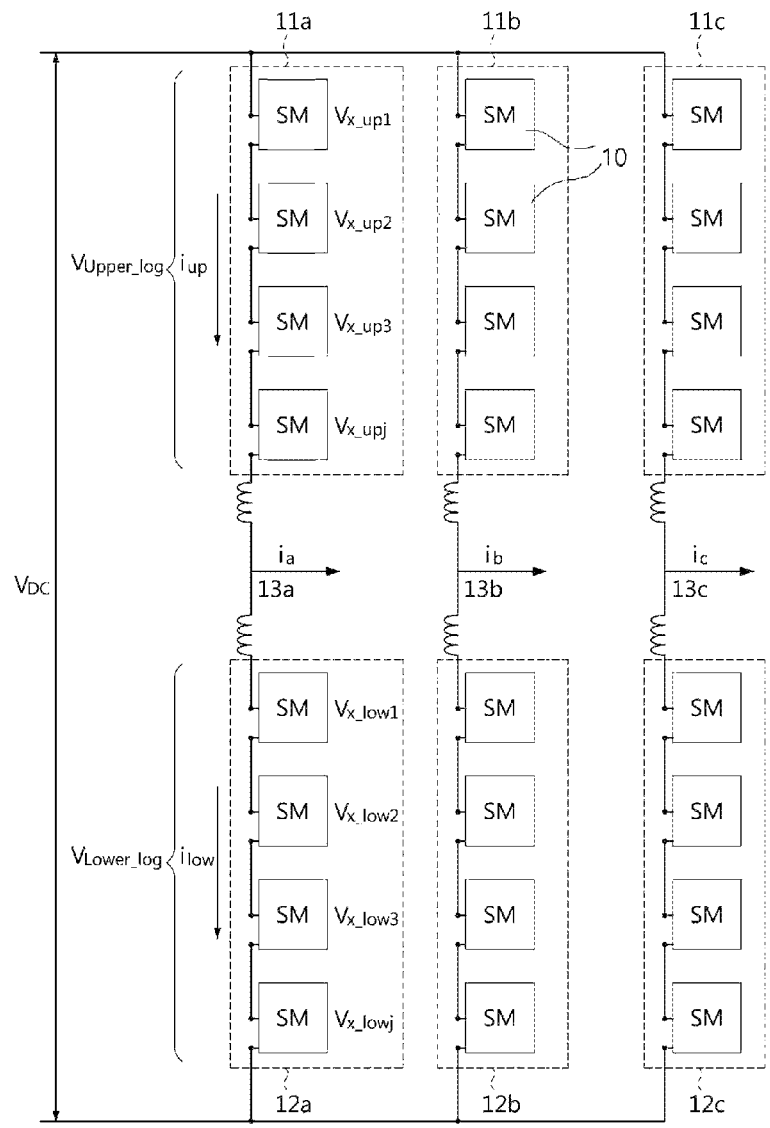
FIG. 1 is a configuration diagram showing a general MMC converter.
Figure 2:
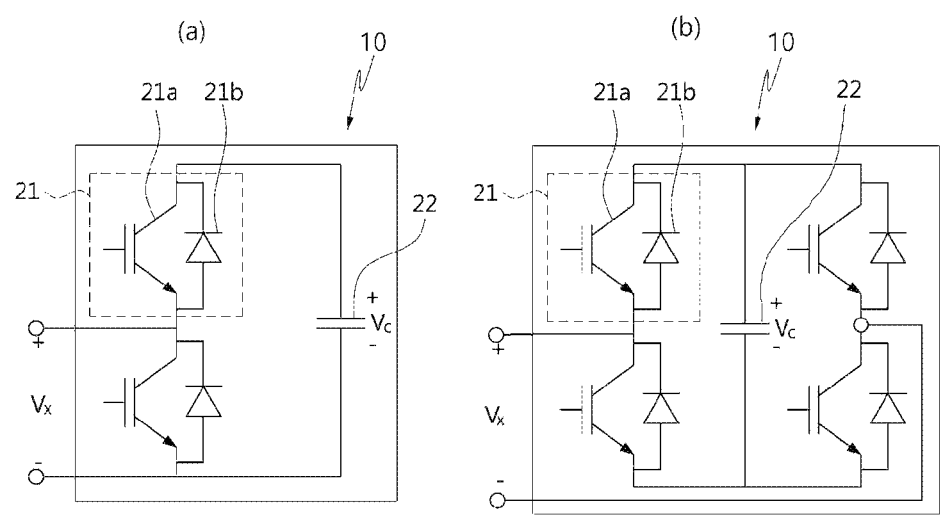
FIG. 2 is a circuit diagram showing a sub-module of a general MMC converter.

Hereinafter, some embodiments of the present invention will be described in detail with reference to exemplary drawings. It is to be noted that, in adding reference numerals to the constituent elements of the drawings, the same constituent elements are denoted by the same reference numerals whenever possible, even when they are shown in different drawings. In the following description of the embodiments of the present invention, when it is determined that a detailed description of known functions and configurations incorporated herein hinders understanding for the embodiments of the present invention, the detailed description will be omitted.

In describing the components of the embodiment of the present invention, terms such as first, second, A, B, (a), and (b) can be used. These terms are intended to distinguish the constituent elements from other constituent elements, and the terms do not limit the nature, order or order of the constituent elements. When a constituent element is described as being "linked", "coupled", or "connected" to another constituent element, it will be appreciated that they can be directly coupled or connected, and also they can be "linked", "coupled", or "connected" with still another constituent element in between.

Figure 3:
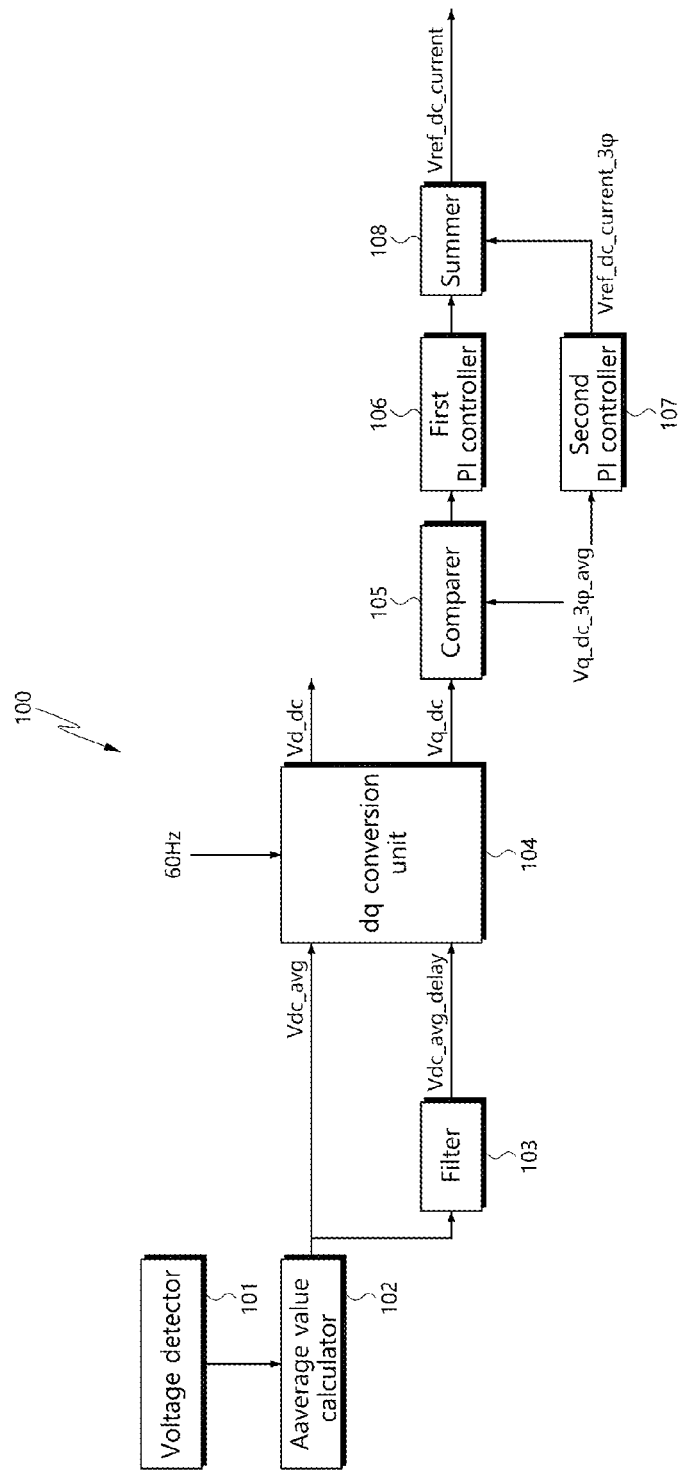
FIG. 3 is a configuration diagram showing a DC current control device for implementing a method of removing a direct current component at an output terminal of an MMC converter according to an embodiment of the present invention.

FIG. 3 is a configuration diagram showing a DC current control device for implementing a method of removing a direct current component at an output terminal of an MMC converter according to an embodiment of the present invention.

Referring to FIG. 3, the DC current controller 100 according to the present invention includes a voltage detector 101 and an average value calculator 102. The voltage detector 101 individually detects charging voltages charged in capacitors of sub-modules connected in series with each other in the MMC converter. The average value calculator 102 calculates an average value Vdc_avg of the charging voltages of the capacitors individually detected as described above.

The plurality of sub-modules connected in series to each other in the plurality of converter arms constituting the MMC converter each are provided with a capacitor for charging the direct current voltage. The charging voltage charged in the capacitors is detected by the voltage detector 101, and the average value calculator 102 calculates and outputs the average value Vdc_avg for the charging voltages of the capacitors individually detected by the voltage detector 101.

The output average value Vdc_avg of the capacitor charging voltage is delayed by a predetermined phase by a filter 103, and then the phase-delayed average value Vdc_avg_delay is output. Here, the phase value is preferably 90 degrees, and thus the average value Vdc_avg_delay is delayed by 90 degrees with respect to the average value Vdc_avg and then output.

A dq conversion unit 104 receives the average value Vdc_avg and the phase-delayed average value Vdc_avg_delay and performs dq conversion to output a d-axis component voltage Vd_dc and a q-axis component voltage Vq_dc. The d-axis component voltage is a voltage value of an active component and the q-axis component voltage is a voltage value of a reactive component.

Here, the dq conversion unit 104 outputs the d-axis component voltage Vd_dc and the q-axis component voltage Vq_dc having a frequency of the direct current component output from the output terminal of the MMC converter. This is to determine which frequency of the direct current component is to be removed. For example, in order to remove a direct current component having a frequency of 60 Hz from an alternating current outputted at the output terminal of the MMC converter, the dq conversion unit 104 outputs the d-axis component voltage Vd_dc and the q-axis component voltage Vq_dc having the frequency of 60 Hz.

As an example in the figure, 60 Hz is shown, but the present invention is not limited thereto. According to the present invention, the frequency of the output terminal voltage of the MMC converter is equal to the frequency of the connected system voltage, and the direct current component included in the alternating current component of the output terminal of the MMC converter also has the same frequency.

A comparer 105 compares the q-axis component voltage Vq_dc output as described above with the three-phase average voltage Vq_dc_3φ_avg for the q-axis component voltage Vq_dc to output an error between these two values.

Here, the error is a difference between the voltage of the q-axis component and the three-phase average voltage for the q-axis component in the dq conversion for the average value of the charging voltage stored in the capacitor of the sub-module. Such difference is caused due to the direct current component included in the alternating current output at the output terminal of the MMC converter. Therefore, in the present invention, a control for reducing such difference is required.

To this end, an offset voltage Vref_dc_current is output through a first proportional-integral (PI) controller 106 in order to reduce the error. This offset voltage is a voltage value used for removing the offset component of the direct current component included in the alternating current voltage appearing at the output terminal of the MMC converter. Accordingly, the DC current controller 100 outputs the offset voltage to the current controller of the HVDC or STATCOM connected to the MMC converter, thereby removing the direct current component generated at the output terminal of the MMC converter.

Herein, according to another embodiment of the present invention, such offset component may be selectively corrected. For this purpose, the DC current controller 100 may further include a second PI controller 107 and a summer 108 selectively. The second proportional-integral (PI) controller 107 receives a three-phase average voltage Vq_dc_3φ_avg and performs PI control according to a predetermined program to output a three-phase offset voltage Vref_dc_current_3φ. Such three-phase offset voltage is an offset voltage value used for removing the direct current component generated at the output stage of the three-phase MMC converter.

Then, the offset voltage Vref_dc_current output from the first PI control unit 106 and the three-phase offset voltage Vref_dc_current_3φ output from the second PI control unit 107 are summed by the summer 108 to be output as a corrected offset voltage.

This is to reflect the three-phase offset voltage Vref_dc_current_3φ on the offset voltage Vref_dc_current as a feedforward component, by which the offset voltage Vref_dc_current may be corrected.

Figure 4:
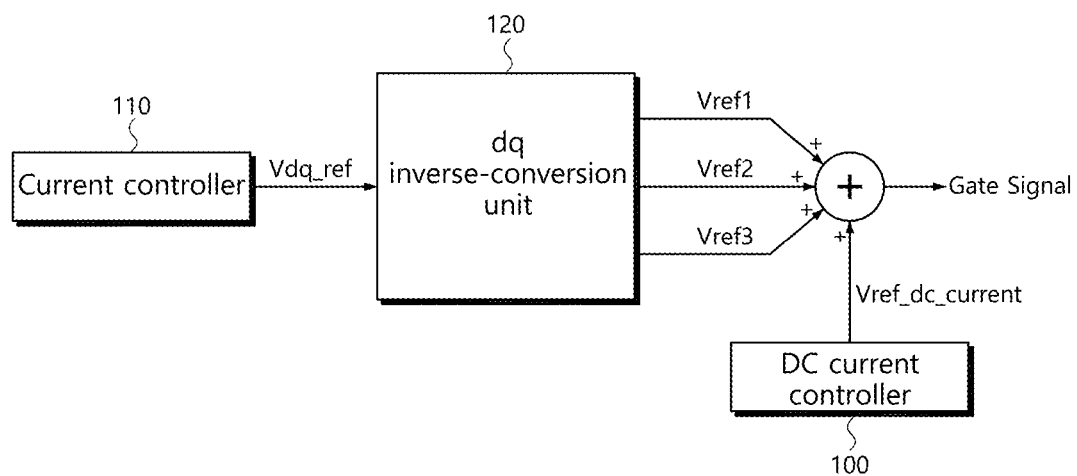
FIG. 4 is an exemplary diagram showing a configuration in which a DC current control device according to the present invention is connected with a sub-module of an MMC converter.

FIG. 4 is an exemplary diagram showing a configuration in which a DC current control device according to the present invention is connected with a sub-module of an MMC converter.

Referring to FIG. 4, the offset voltage output from the DC current controller 100 according to the present invention is summed with an output voltage of a dq inverse conversion unit 120 to be output as a gate voltage of the semiconductor switch included in the submodule of the MMC converter.

Specifically, for the purpose of switching operation of the semiconductor switch of the sub-module, the current controller 110 outputs the dq voltage reference component Vdq_ref which is dq-converted.

The dq voltage reference component Vdq_ref is converted into three-phase reference voltages Vref1, Vref2, and Vref3 by the dq inverse conversion unit 120 which performs a dq inverse conversion on the dq conversion by the dq conversion unit 104.

The result obtained by summing the three-phase reference voltage and any one of the offset voltage output from the first PI control unit 106 or the corrected offset voltage output from the summer 108 is output as a gate signal of the semiconductor switch of the sub-module.

While the present invention has been described in connection with what is presently considered to be the most practical and preferred embodiment, it is to be understood that the invention is not limited to the disclosed embodiments. That is, within the scope of the present invention, one or more of all of the elements may be selectively coupled to each other. It is to be understood that the terms "includes", "comprises", or "having", as used herein, mean that a component can be implied unless specifically stated to the contrary, but should be construed as including other elements. All terms including technical or scientific terms have the same meaning as commonly understood by one of ordinary skill in the art to which this invention belongs, unless otherwise defined. Terms commonly used, such as predefined terms, should be interpreted to be consistent with the contextual meanings of the related art, and are not to be construed as ideal or overly formal, unless expressly defined to the contrary.

While the present invention has been described in connection with what is presently considered to be practical exemplary embodiments, it is to be understood that the invention is not limited to the disclosed embodiments. On the contrary, is intended to cover various modifications and equivalent arrangements included within the spirit and scope of the appended claims. Therefore, the embodiments disclosed in the present invention are not intended to limit the scope of the present invention but to limit the scope of the technical idea of the present invention. The scope of protection of the present invention should be construed according to the following claims, and all technical ideas within the scope of equivalents thereof should be construed as being included in the scope of the present invention.

The invention claimed is:

1. A method of removing a direct current component at an output terminal of a modular multilevel converter (MMC), the method comprising:
   a detection step of individually detecting charging voltages charged in capacitors of a plurality of sub-modules connected in series to each other in the MMC;
   a first output step of outputting an average value of the individually detected charging voltages;
   a second output step of delaying the outputted average value by a predetermined phase to output a phase-delayed average value;
   a third output step of outputting the average value and the phase-delayed average value as a q-axis component voltage by using a predetermined dq conversion unit;
   a calculation step of calculating an error between the q-axis component voltage and a three-phase average voltage; and
   a fourth output step of outputting, through a pre-determined first proportional integration (PI) control unit, an offset voltage for reducing the error,
   wherein the method further comprises, before the detection step:
   outputting a dq voltage reference component output from a current control unit of the MMC; and
   converting the dq voltage reference component to a three-phase reference voltage using a dq inverse conversion unit,
   wherein, after the fourth output step, a second proportional-integral controller receives the three-phase average voltage and performs PI control to output a three-phase offset voltage, wherein the offset voltage and the three-phase offset voltage are summed to output a corrected offset voltage, and wherein the three-phase reference voltage and the corrected offset voltage are summed to output a gate signal for a semiconductor switch of a sub-module of the plurality of sub-modules.

2. The method of claim 1, wherein the predetermined dq conversion unit outputs the q-axis component voltage having a frequency of a direct current component output at the output terminal of the MMC.

3. The method of claim 1, wherein the phase-delayed average value output in the second output step is delayed by 90 degrees with respect to the average value.

* * * * *